United States Patent
Shao et al.

(10) Patent No.: US 9,610,566 B2
(45) Date of Patent: Apr. 4, 2017

(54) METHOD OF FORMING A CATALYST WITH AN ATOMIC LAYER OF PLATINUM ATOMS

(75) Inventors: Minhua Shao, Manchester, CT (US); Michael Paul Humbert, Manchester, CT (US); Keiichi Kaneko, Aichi-ken (JP)

(73) Assignees: Toyota Jidosha Kabushiki Kaisha, Toyota-Shi (JP); Audi AG, Ingolstadt (DE)

(*) Notice: Subject to any disclaimer, the term of this patent is extended or adjusted under 35 U.S.C. 154(b) by 0 days.

(21) Appl. No.: 14/000,636

(22) PCT Filed: Feb. 22, 2011

(86) PCT No.: PCT/US2011/025693
§ 371 (c)(1),
(2), (4) Date: Aug. 21, 2013

(87) PCT Pub. No.: WO2012/115624
PCT Pub. Date: Aug. 30, 2012

(65) Prior Publication Data
US 2013/0324394 A1 Dec. 5, 2013

(51) Int. Cl.
*B01J 23/42* (2006.01)
*B01J 23/44* (2006.01)
(Continued)

(52) U.S. Cl.
CPC ............... *B01J 23/44* (2013.01); *B01J 21/08* (2013.01); *B01J 23/8926* (2013.01);
(Continued)

(58) Field of Classification Search
CPC .. B01J 35/006; B01J 35/0073; B01J 35/0013; B01J 23/8926; B01J 37/0201;
(Continued)

(56) References Cited

U.S. PATENT DOCUMENTS

2006/0134505 A1  6/2006 Wang et al.
2006/0135359 A1  6/2006 Adzic et al.
(Continued)

FOREIGN PATENT DOCUMENTS

JP   2008-525638 A    7/2008
JP   2008-545604 A   12/2008
(Continued)

OTHER PUBLICATIONS

International Search Report for PCT Application No. PCT/US2011/025693 completed on Nov. 29, 2011.
(Continued)

*Primary Examiner* — Melvin C Mayes
*Assistant Examiner* — Haytham Soliman
(74) *Attorney, Agent, or Firm* — Seed IP Law Group LLP

(57) ABSTRACT

A method of forming a catalyst material includes hindering the reaction rate of a displacement reaction and controlling the formation of platinum clusters, where an atomic layer of metal atoms is displaced with platinum atoms, to produce a catalyst material that includes an atomic layer of the platinum atoms.

12 Claims, 1 Drawing Sheet

(51) Int. Cl.
  B01J 37/06       (2006.01)
  B01J 37/34       (2006.01)
  B01J 21/08       (2006.01)
  B01J 23/89       (2006.01)
  B01J 35/00       (2006.01)
  B01J 37/00       (2006.01)
  B01J 37/02       (2006.01)
  H01M 4/86        (2006.01)
  H01M 4/92        (2006.01)

(52) U.S. Cl.
  CPC ......... B01J 35/006 (2013.01); B01J 35/0013 (2013.01); B01J 35/0073 (2013.01); B01J 37/0018 (2013.01); B01J 37/0201 (2013.01); B01J 37/06 (2013.01); B01J 37/342 (2013.01); B01J 37/343 (2013.01); *H01M 4/8657* (2013.01); *H01M 4/926* (2013.01)

(58) Field of Classification Search
  CPC ........ B01J 37/06; B01J 37/342; B01J 37/343; B01J 21/08; B01J 37/0018; H01M 4/8657; H01M 4/926
  USPC ......................................................... 502/339
  See application file for complete search history.

(56) References Cited

U.S. PATENT DOCUMENTS

| | | |
|---|---|---|
| 2006/0263675 A1 | 11/2006 | Adzic et al. |
| 2007/0026292 A1 | 2/2007 | Adzic et al. |
| 2007/0264189 A1 | 11/2007 | Adzic et al. |
| 2008/0081017 A1* | 4/2008 | Zhou et al. .................. 423/584 |
| 2010/0177462 A1 | 7/2010 | Adzic et al. |
| 2010/0197490 A1 | 8/2010 | Adzic et al. |

FOREIGN PATENT DOCUMENTS

| | | |
|---|---|---|
| WO | 2010/005773 A1 | 1/2010 |
| WO | 2011/099957 A1 | 8/2011 |
| WO | 2012/105978 A1 | 8/2012 |
| WO | 2012/115624 A1 | 8/2012 |
| WO | 2012/144974 A1 | 10/2012 |

OTHER PUBLICATIONS

Brankovic et al., "Metal monolayer deposition by replacement of metal adlayers on electrode surfaces," *Surface Science* 474:L173-L179, 2001.

Extended European Search Report, mailed Jul. 11, 2014, for corresponding European Application No. 11859588.3-1352 / 2678105, 10 pages.

Papadimitriou et al., "Preparation and characterisation of platinum- and gold-coated copper, iron, cobalt and nickel deposits on glassy carbon substrates," *Electrochimica Acta* 53:6559-6567, 2008.

Qu et al., "Shape/Size-Controlled Syntheses of Metal Nanoparticles for Site-Selective Modification of Carbon Nanotubes," *J. Am. Chem. Soc.* 128:5523-5532, 2006.

Guang, "Electroless Nickel Plating of Aluminum Alloy," *Materials Protection* 28(9):16-17, 1995, with English machine translation, 7 pages.

Xin et al., "Bright Electroless Nickel Plating of Aluminum and Aluminum Alloy," *Journal of Xiangtan Institute of Machinery & Electricity* 2:29-34, 2000, with English machine translation, 18 pages.

* cited by examiner

METHOD OF FORMING A CATALYST WITH AN ATOMIC LAYER OF PLATINUM ATOMS

BACKGROUND

This disclosure relates to a method of producing a catalyst material having a more uniform atomic layer of platinum atoms.

Platinum is known and used as a catalytic material in electrochemical reactions, such as an electrochemical reaction within a fuel cell to generate an electric current. The platinum may be deposited on a metal core of a noble metal, which is supported on a carbon particle. To increase mass activity of the platinum, the platinum is provided as a thin layer on the noble metal core.

One conventional manufacturing process for making such catalytic materials involves first depositing a thin layer of metal atoms of a lower reduction potential than the platinum onto noble metal core particles. Some manufacturers use an underpotential deposition process to deposit copper atoms as the lower reduction potential metal. The core particles are then mixed with a solution that contains a platinum salt. The platinum atoms in the solution spontaneously displace the copper atoms on the noble metal cores to produce a thin layer of the platinum atoms on the noble metal cores.

SUMMARY

Disclosed is a method of forming a catalyst material that includes hindering the reaction rate of a displacement reaction, where an atomic layer of metal atoms is displaced with platinum atoms, to produce a catalyst material that includes an atomic layer of the platinum atoms.

In another aspect, a method of forming a catalyst material includes displacing an atomic layer of metal atoms with platinum atoms in the presence of a surfactant to produce a catalyst material that includes an atomic layer of the platinum atoms.

Also disclosed is a method of forming a catalyst material that includes the steps of providing a particle that includes a metal core that is covered with an atomic layer of metal atoms, providing a solution that includes a surfactant and a platinum salt, and treating the particle with the solution to displace the metal atoms with platinum atoms from the solution and produce a catalyst material that includes the metal core covered with an atomic layer of the platinum atoms.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
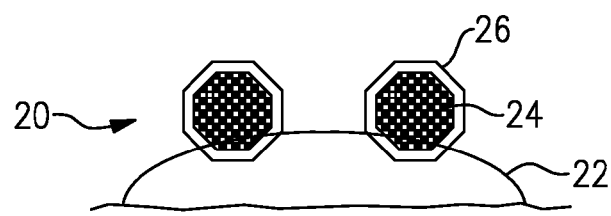
FIG. 1 illustrates an example catalyst material.

FIG. 1 schematically illustrates selected portions of an example catalyst material 20 that is highly active and may be used in a fuel cell or other catalytic environment. In this example, the catalyst material 20 includes a carbon support 22 and metal cores 24 that are attached on the surfaces of the carbon support. The metal cores 24 are covered with a shell 26. The shell 26 is an atomic layer of platinum atoms. The metal cores 24 may be a noble metal or mixture of metals, such as palladium, gold or other noble metals.

In embodiments, the shell 26 is an atomic monolayer (i.e., one atom thick). However, although the shell 26 generally is of uniform thickness, it is to be understood that some portions of the shell 26 may be thinner (submonolayer) or thicker (several atoms thick).

As will be described in further detail, the method used to form the shell 26 on the metal core 24 produces a more uniform thickness of the atomic layer of platinum atoms and thereby enhances the mass activity of the platinum.

The method used to form the shell 26 involves a displacement reaction, where platinum atoms displace metal atoms of a lower reduction potential on the metal core 24. In some examples, the metal atoms of lower reduction potential are copper. The copper may be deposited onto the metal core 24 using an underpotential deposition process (UPD). UPD is a technique for depositing a temporary shell 28 of copper atoms in an atomic layer thickness. The metal core 24 and temporary shell 28 of copper is then treated with a solution that includes platinum.

In conventional methods, the platinum atoms in the solution spontaneously displace the lower reduction potential copper atoms to produce an atomic layer of the platinum atoms. The reaction rate of the spontaneous displacement is rapid and results in variations in the thickness of the shell of platinum atoms. That is, the platinum atoms do not displace the copper atoms on a one-for-one basis. Instead, the platinum atoms tend to cluster or leave portions of the metal core uncovered.

The method disclosed herein involves hindering the reaction rate of the displacement reaction and controlling or reducing the deposition of platinum atoms on the existing platinum to provide a more uniform coverage of the metal core 24 with the platinum atoms of the shell 26. In one example, the displacement reaction of the disclosed method is conducted in the presence of a surfactant, such as citric acid and/or ethylenediamine tetraacetic acid (EDTA), which hinders or slows the reaction rate to achieve controlled displacement of the copper atoms with the platinum atoms. The surfactant forms a coordination complex with platinum salt. That is, the platinum salt is more difficult to reduce and thereby slows the reaction rate of the displacement reaction. At the slower reaction rate, the platinum atoms have less of a tendency to cluster or leave open portions on the surface of the metal core 24. The resulting shell 26 thereby has a more uniform thickness and a corresponding higher mass activity. The surfactant may also hinder the deposition of platinum atoms on the existing platinum atoms. The surfactant competes with newly reduced platinum atoms by adsorbing on the existing platinum atoms so that the platinum atoms can only deposit on the metal core 24. The formation of the platinum clusters is thereby reduced.

Figure 2:
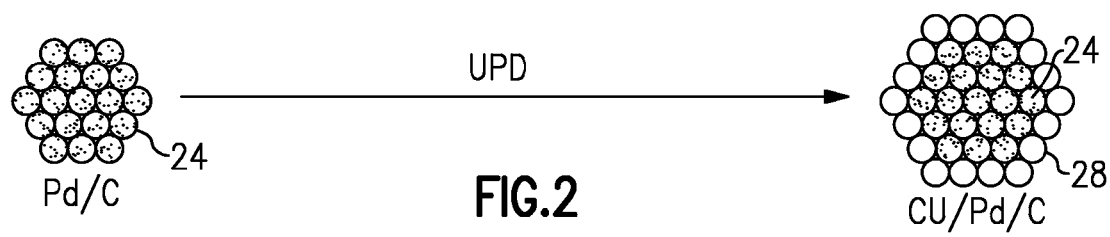
FIG. 2 illustrates an example of depositing an atomic layer of metal by underpotential deposition.

FIG. 2 schematically depicts an example UPD process. Initially, on the left side of the figure prior to the reaction, a metal core 24 (or cores) is provided on a carbon support (not shown). The metal core 24 is then treated in the UPD process to deposit the temporary shell 28 of copper atoms onto the metal core 24. The resulting thin layer of copper atoms may have an atomic thickness ranging from subatomic to several atomic thicknesses. In embodiments, the temporary shell 28 is substantially an atomic monolayer.

Figure 3:
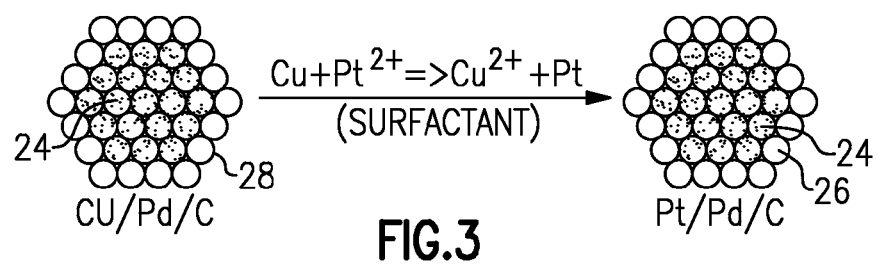
FIG. 3 illustrates an example of a displacement reaction using a surfactant to hinder the reaction rate.

As illustrated in FIG. 3, the copper atoms of the temporary shell 28 are then displaced in the displacement reaction to produce the shell 26 of platinum atoms on the metal core 24. In this example, the displacement reaction is conducted in the presence of a surfactant to slow the reaction rate and to control or reduce the deposition of platinum atoms on the existing platinum atoms, and thereby produce a uniform atomic layer of the platinum atoms, as described above.

In embodiments, the surfactant is provided in a solution in which the metal cores 24 are mixed. For example, the solution may include a diluted acid, the surfactant, and a platinum salt to provide the platinum atoms. The diluted acid may be sulfuric acid. The surfactant may be selected from citric acid, ethylenediamine tetraacetic acid (EDTA), carbon monoxide or mixtures thereof. The surfactant hinders the displacement reaction by forming a coordination complex or reduce the platinum cluster formation by adsorbing on the existing platinum atoms. The following is an additional example of the disclosed method.

Example 1

Preparation of Platinum Monolayer Catalyst

A Pd/C powder is loosely placed directly on a graphite sheet or cast and pressed on a substrate.

Optionally, the Pd/C is cleaned by (a) mixing a solution of the Pd/C powder and diluted sulfuric acid and establishing an electric potential of the solution that is in the hydrogen evolution region (e.g., −50 mV vs RHE), (b) potential cycling the Pd/C powder (e.g., 0.5-1.1 V for a number of cycles with a scanning rate of 10 mV/s) or (c) purging the Pd/C powder with hydrogen for 30 minutes.

The electric potential of the Pd/C powder is held at a copper UPD potential, which is predetermined in a solution of $Cu^{2+}$ (0.2 M $CuSO_4$) and diluted acid (0.5 M $H_2SO_4$) for a certain time (e.g., 2 hours). Alternatively, the solution is potential cycled to determine the copper UPD potential. Optionally, after the cycling, the solution is held at that potential for approximately 30 minutes.

A solution of a platinum salt (e.g., $K_2PtCl_4$) in a diluted acid (e.g., 0.05 M $H_2SO_4$) is prepared. The amount of platinum salt is approximately between 1.1 and 3 times the amount calculated to replace all the copper atoms on the Pd/C powder. Citric acid is then added into the solution at a 3.5 mM or higher concentration.

The platinum salt solution is then mixed with the solution containing the Pd/C powder to produce the catalyst. The mixing may include adding the solution that contains the Pd/C powder to the platinum salt solution using a dropper or pipette. The solution may be vibrated ultrasonically to disperse the Pd/C powder.

The catalyst is then filtered out from the solution and washed with hot water. The catalysts may be further cleaned by purging with hydrogen or washing with a diluted acid.

The catalyst produced in Example 1 exhibited a relatively high mass activity. The catalyst produced by Example 1 exhibited a platinum mass activity of 0.6 A/mg. In comparison, a catalyst produced without the surfactant exhibited a platinum mass activity of 0.36 A/mg.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of forming a catalyst material, the method comprising:
hindering the reaction rate of a displacement reaction to control the formation of platinum clusters, wherein an atomic layer of metal atoms is displaced with platinum atoms, to produce a catalyst material that includes an atomic layer of the platinum atoms, wherein the hindering includes:
A) conducting the displacement reaction in the presence of a platinum coordinating compound; and
B) forming a coordination complex with the platinum coordinating compound and: i) a platinum salt; or ii) the atomic layer of platinum atoms during the displacement reaction, thereby hindering displacement of the metal atoms with the platinum atoms.

2. The method as recited in claim 1, wherein the metal atoms comprise copper.

3. The method as recited in claim 1, wherein the platinum coordinating compound is citric acid.

4. The method as recited in claim 1, wherein the platinum coordinating compound is ethylenediamine tetraacetic acid (EDTA).

5. The method as recited in claim 1, wherein the atomic layer of metal atoms is on a noble metal core.

6. A method of forming a catalyst material, the method comprising:
displacing an atomic layer of metal atoms with platinum atoms in the presence of a platinum-coordinating compound to produce a catalyst material that includes an atomic layer of the platinum atoms, the method further comprising forming a coordination complex with the platinum coordinating compound and: i) a platinum salt; or ii) the atomic layer of platinum atoms during displacement of the atomic layer of metal atoms.

7. The method as recited in claim 6, wherein the platinum-coordinating compound is selected from a group consisting of citric acid, EDTA and mixtures thereof.

8. The method as recited in claim 6, wherein the platinum-coordinating compound is in solution with an acid and the platinum salt.

9. A method of forming a catalyst material, the method comprising:
providing a particle that includes a metal core that is covered with an atomic layer of metal atoms;
providing a solution that includes a platinum-coordinating compound and a platinum salt;
treating the particle with the solution to thereby displace the metal atoms with platinum atoms and produce a catalyst material that includes the metal core covered with an atomic layer of the platinum atoms; and
hindering displacement of the metal atoms with the platinum atoms by forming a coordination complex with the platinum coordinating compound and: i) the platinum salt; or ii) the atomic layer of platinum atoms during displacement of the metal atoms.

10. The method as recited in claim 9, further comprising depositing the atomic layer of metal atoms onto the metal core using underpotential deposition (UPD).

11. The method as recited in claim 9, wherein the platinum-coordinating compound is selected from a group consisting of citric acid, EDTA and mixtures thereof.

12. The method as recited in claim 9, wherein the treating of the particle with the solution includes mixing the particle with the solution.

* * * * *